(12) United States Patent
Sun

(10) Patent No.: US 10,193,738 B2
(45) Date of Patent: Jan. 29, 2019

(54) METHOD FOR SERVICE CONTENT DISTRIBUTION UNDER HETEROGENEOUS NETWORK AND SERVICE MANAGEMENT PLATFORM

(71) Applicant: ZTE Corporation, Shenzhen, Guangdong (CN)

(72) Inventor: Aifang Sun, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 826 days.

(21) Appl. No.: 14/420,743

(22) PCT Filed: Jun. 24, 2013

(86) PCT No.: PCT/CN2013/077820
§ 371 (c)(1),
(2) Date: Feb. 10, 2015

(87) PCT Pub. No.: WO2013/178109
PCT Pub. Date: Dec. 5, 2013

(65) Prior Publication Data
US 2015/0236890 A1    Aug. 20, 2015

(30) Foreign Application Priority Data

Aug. 28, 2012    (CN) .......................... 2012 1 0309871

(51) Int. Cl.
*G06F 15/16* (2006.01)
*H04L 12/24* (2006.01)
(Continued)

(52) U.S. Cl.
CPC ............ *H04L 41/042* (2013.01); *H04L 67/12* (2013.01); *H04L 69/321* (2013.01); *H04W 48/18* (2013.01)
(Continued)

(58) Field of Classification Search
CPC ..... H04L 41/042; H04L 69/321; H04L 67/12; H04L 5/0037; H04L 65/4084; H04W 48/18; H04N 21/64738
See application file for complete search history.

(56) References Cited

U.S. PATENT DOCUMENTS

| | | | | |
|---|---|---|---|---|
| 6,868,083 | B2 * | 3/2005 | Apostolopoulos | ...... H04L 29/06 370/216 |
| 7,464,178 | B2 * | 12/2008 | Corrigan | ................. H04L 29/06 370/351 |

(Continued)

FOREIGN PATENT DOCUMENTS

| | | |
|---|---|---|
| CN | 101119314 A | 2/2008 |
| CN | 101827396 A | 9/2010 |

(Continued)

OTHER PUBLICATIONS

International Search Report in international application No. PCT/CN2013/077820, dated Aug. 29, 2013.

(Continued)

*Primary Examiner* — Shean Tokuta
(74) *Attorney, Agent, or Firm* — Oppedahl Patent Law Firm LLC

(57) ABSTRACT

A method for service content distribution under a heterogeneous network and a service management platform are provided. The method includes that the service management platform stores and maintains the context information of a network and a terminal, and the service management platform makes a query to obtain an index of the context information according to a received service request, selects a cooperative network and terminal for service content distribution, and performs service content distribution according to the selected cooperative network and terminal. Accordingly, a proper network and a proper terminal can be selected according to a service request under a heteroge-
(Continued)

neous network, terminals in a surrounding environment of a user are fully utilized, and radio resources are further fully utilized.

8 Claims, 2 Drawing Sheets

(51) Int. Cl.
*H04L 29/08* (2006.01)
*H04W 48/18* (2009.01)

(56) References Cited

U.S. PATENT DOCUMENTS

| | | | |
|---|---|---|---|
| 7,509,332 B1 | 3/2009 | Milby | |
| 8,077,717 B2* | 12/2011 | Yan | H04L 12/18 370/312 |
| 8,316,146 B2* | 11/2012 | Ehn | H04L 65/4084 709/217 |
| 8,392,530 B1* | 3/2013 | Manapragada | H04L 65/4076 348/211.3 |
| 8,583,823 B2* | 11/2013 | Blewett | H04L 67/1002 709/220 |
| 2002/0059400 A1 | 5/2002 | Ikami | |
| 2002/0174434 A1* | 11/2002 | Lee | H04N 21/234327 725/74 |
| 2004/0143672 A1* | 7/2004 | Padmanabham | H04L 29/06027 709/231 |
| 2004/0165703 A1* | 8/2004 | Jones | H04M 3/02 379/88.13 |
| 2006/0007947 A1* | 1/2006 | Li | H04L 12/1854 370/432 |
| 2006/0168220 A1* | 7/2006 | Katoh | H04L 63/08 709/225 |
| 2006/0190615 A1* | 8/2006 | Panwar | H04L 29/06027 709/231 |
| 2008/0256418 A1* | 10/2008 | Luby | H03M 13/27 714/762 |
| 2008/0270274 A1* | 10/2008 | Mo | G06Q 30/04 705/34 |
| 2008/0307108 A1* | 12/2008 | Yan | H04L 65/1016 709/231 |
| 2008/0311914 A1* | 12/2008 | Tinnakornsrisuphap | H04W 36/0083 455/436 |
| 2009/0182815 A1* | 7/2009 | Czechowski | H04L 67/104 709/206 |
| 2010/0005185 A1* | 1/2010 | Liu | H04L 67/104 709/231 |
| 2010/0110890 A1* | 5/2010 | Rainer | H04M 15/00 370/232 |
| 2011/0150006 A1* | 6/2011 | Unkel | G09G 5/005 370/503 |
| 2011/0151924 A1* | 6/2011 | Miller | H04W 48/18 455/552.1 |
| 2011/0276623 A1* | 11/2011 | Girbal | G06F 17/30132 709/203 |
| 2012/0106333 A1* | 5/2012 | Lee | H04L 47/125 370/230 |
| 2012/0114302 A1* | 5/2012 | Randall | G11B 27/105 386/241 |
| 2012/0166289 A1* | 6/2012 | Gadoury | G06Q 30/0269 705/14.66 |
| 2012/0198020 A1* | 8/2012 | Parker | H04W 12/08 709/217 |
| 2012/0215779 A1* | 8/2012 | Lipstone | G06F 17/30035 707/737 |
| 2012/0314609 A1* | 12/2012 | Chang | H04B 7/15592 370/252 |
| 2012/0324490 A1* | 12/2012 | Hwang | H04N 21/2393 725/9 |
| 2013/0114597 A1* | 5/2013 | Ogisawa | H04L 12/185 370/390 |
| 2013/0132602 A1* | 5/2013 | El-Beltagy | H04L 67/1078 709/231 |
| 2013/0208184 A1* | 8/2013 | Castor | H04B 10/1149 348/552 |
| 2013/0304877 A1* | 11/2013 | Um | H04L 41/082 709/220 |
| 2014/0094159 A1* | 4/2014 | Raleigh | H04W 24/02 455/418 |
| 2014/0226594 A1* | 8/2014 | Liu | H04L 67/1097 370/329 |
| 2014/0258391 A1 | 9/2014 | Sun | |
| 2014/0313989 A1* | 10/2014 | Doken | H04L 65/605 370/329 |
| 2015/0113160 A1* | 4/2015 | Sun | G06F 17/30516 709/231 |
| 2015/0150065 A1* | 5/2015 | Shankar | H04N 7/17354 725/109 |
| 2015/0236890 A1* | 8/2015 | Sun | H04L 41/042 709/201 |
| 2016/0164935 A1* | 6/2016 | Chen | H04L 1/1877 709/219 |
| 2017/0078922 A1* | 3/2017 | Raleigh | H04W 28/10 |

FOREIGN PATENT DOCUMENTS

| | | |
|---|---|---|
| CN | 102098135 A | 6/2011 |
| CN | 102413069 A | 4/2012 |
| CN | 102752204 A | 10/2012 |
| CN | 102869003 A | 1/2013 |
| EP | 2765741 A1 | 8/2014 |
| JP | H099328 A | 1/1997 |
| JP | 2002132613 A | 5/2002 |
| JP | 2004062342 A | 2/2004 |
| JP | 2009009328 A | 1/2009 |
| JP | 2009129386 A | 6/2009 |
| WO | 2006075677 A1 | 7/2006 |

OTHER PUBLICATIONS

English Translation of the Written Opinion of the International Search Authority in international application No. PCT/CN2013/077820, dated Aug. 29, 2013.

Next Generation Service Interfaces Requirements, dated May 29, 2012.

Supplementary European Search Report in European application No. 13797889.6, dated Jul. 28, 2015.

* cited by examiner

METHOD FOR SERVICE CONTENT DISTRIBUTION UNDER HETEROGENEOUS NETWORK AND SERVICE MANAGEMENT PLATFORM

TECHNICAL FIELD

The disclosure relates to the field of wireless communications, in particular to a method for service content distribution under a heterogeneous network, and a service management platform thereof.

BACKGROUND

A ubiquitous network and the Internet of things are hybrid networks of multiple types of heterogeneous networks, and there are multiple kinds of heterogeneous network terminals existing in the networks. The heterogeneous network terminals in a surrounding environment can be fully utilized together to download and provide a service for a user, so that network and terminal resources can be fully utilized, the service can be provided for the user better, faster and more conveniently, and a user experience can be enhanced.

In a process of providing a service for a user by virtue of the multiple types of heterogeneous network terminals, it is necessary to select a network and a terminal where the network exists. How to select a proper network and a proper terminal for service content distribution according to a service request under the condition of coexistence of multiple types of heterogeneous networks and terminals thereof is a problem urgently to be solved in a present research on the ubiquitous network and the Internet of things.

SUMMARY

In view of this, a main purpose of the embodiments of the disclosure is to provide a method for service content distribution under a heterogeneous network and a service management platform, so as to select a proper network and a proper terminal according to a service request under the heterogeneous network, fully utilize terminals in a surrounding environment of a user and further fully utilize radio resources.

In order to achieve the purpose, the technical solutions of the embodiments of the disclosure are implemented as follows.

An embodiment of the disclosure provides a method for service content distribution under a heterogeneous network, the method including that:

a service management platform stores and maintains context information of a network and a terminal; and the service management platform makes a query to obtain an index of the context information according to a received service request, selects a cooperative network and terminal for service content distribution, and performs the service content distribution according to the selected cooperative network and terminal.

Preferably, the step that the service management platform performs service content distribution according to the selected cooperative network and terminal may include that:

the service management platform performs comparative analysis on information in the service request and an index of service data information buffered by the service management platform, judges whether a requested service content has been stored in the service management platform or not according to the comparative analysis, distributes corresponding stored service content to the cooperative network and terminal if the requested service content has been stored in the service management platform, otherwise makes a request to service content providing equipment for corresponding service content, and distributes acquired service content to the cooperative network and terminal.

Preferably, the method further may include that:

if multiple cooperative networks and terminals are selected, the service management platform performs service stream segmentation on the service content when distributing the service content, and transmits service sub-streams obtained by the service stream segmentation to the corresponding cooperative networks and terminals respectively.

Preferably, after the service content is distributed to the cooperative network and terminal, the method further may include that:

the cooperative terminal pushes the received service content to an initiator terminal of the service request, and the initiator terminal finishes the presentation of the service content by service aggregation.

Preferably, the service management platform may be located between a network layer and an application layer.

An embodiment of the disclosure also provides a service management platform, which includes a joint radio resource management server and an edge server, wherein the joint radio resource management server is configured to store and maintain context information of a network and a terminal, and provide a service of making a query to obtain the context information; and the edge server is configured to receive a service request, make a query to the joint radio resource management server to obtain an index of the context information according to the received service request, select a cooperative network and terminal for service content distribution, and distribute service content according to the selected cooperative network and terminal.

Preferably, the edge server may be further configured to perform comparative analysis on information in the service request and an index of service data information buffered by the edge server, judge whether requested service content has been stored in the edge server or not according to the comparative analysis, distribute the corresponding stored service content to the cooperative network and terminal if the requested service content has been stored in the edge server, otherwise make a request for the corresponding service content to service content providing equipment, and distribute the acquired service content to the cooperative network and terminal.

Preferably, the edge server may be further configured to, if multiple cooperative networks and terminals are selected, perform service stream segmentation on the service content when distributing the service content, and transmit service sub-streams obtained by the service stream segmentation to the corresponding cooperative networks and terminals respectively.

Preferably, the service management platform may be located between a network layer and an application layer.

According to the method for service content distribution under a heterogeneous network and the service management platform provided by the embodiments of the disclosure, radio network resources and terminal resources in a surrounding environment of a user can be fully utilized under the condition of coexistence of multiple heterogeneous networks, and the networks and the terminals are selected by virtue of the service management platform to provide the cooperative network and terminal more suitable for a requested service, so that an optimal technical solution for service content distribution is provided, the requested service can be better downloaded and provided, and a user experience is further enhanced.

DETAILED DESCRIPTION

The technical solutions of the disclosure are further described below with reference to the drawings and specific embodiments in detail.

In order to select a proper network and a proper terminal according to a service request under a heterogeneous network, fully utilize terminals in a surrounding environment of a user and further fully utilize radio resources, an embodiment of the disclosure discloses a method for service content distribution under a heterogeneous network, the method aims to provide a service management platform, which stores and maintains the context information of a network and a terminal, makes a query to obtain an index of the context information according to a received service request, selects a cooperative network and terminal for service content distribution, and performs the service content distribution according to the selected cooperative network and terminal.

The step that the service management platform performs the service content distribution according to the selected cooperative network and terminal includes that the service management platform judges whether a requested service content has been stored in the service management platform or not according to the service request, distributes a corresponding stored service content to the cooperative network and terminal if the requested service content has been stored in the service management platform, otherwise makes a request for the corresponding service content to service content providing equipment, and distributes an acquired service content to the cooperative network and terminal.

Preferably, if multiple cooperative networks and terminals are selected, the service management platform performs service stream segmentation on the service content when distributing the service content, and transmits service substreams obtained by stream segmentation to the corresponding cooperative networks and terminals respectively.

After the service content is distributed to the cooperative network and terminal, the cooperative terminal pushes the received service content to the initiator terminal of the service request, and the initiator terminal finishes, in a service aggregation form, the presentation of the service content.

Figure 1:
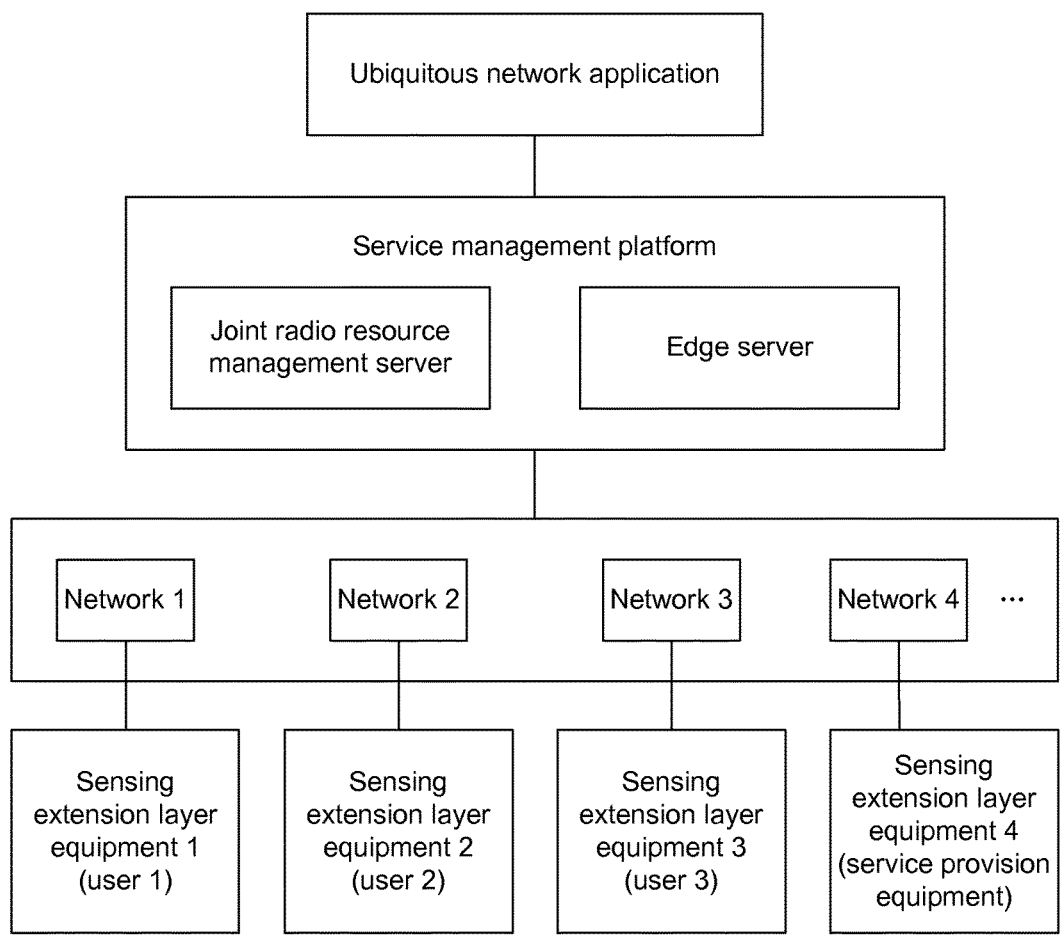
FIG. 1 is a diagram of a system architecture for service content distribution under a heterogeneous network according to an embodiment of the disclosure.
Figure 2:
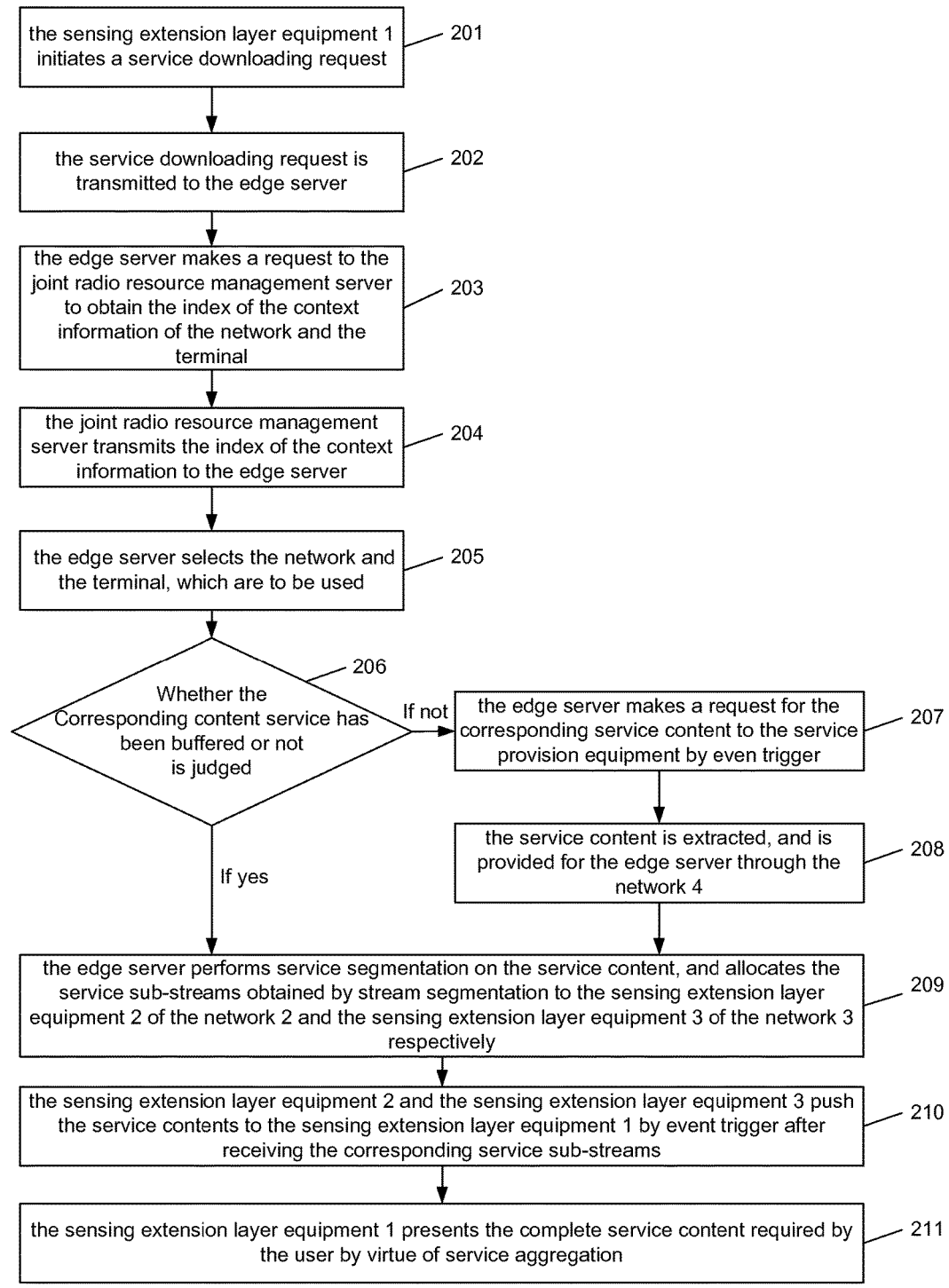
FIG. 2 is a flowchart of a method for service content distribution under a heterogeneous network according to an embodiment of the disclosure.

As shown in FIG. 1, a system architecture adopted for implementing the method of the embodiment of the disclosure mainly includes an ubiquitous network (or Internet of things) application, a service management platform, a network, and sensing extension layer equipment;

wherein the ubiquitous network or Internet of things application refers to various requirements and applications of users of a ubiquitous network or the Internet of things, for example, intelligent building, emergency fire fighting and intelligent campus;

the service management platform is located between a network layer and an application layer, and is configured to store the context information of the network and the terminal, and maintain and manage the context information in a unified manner;

the network includes, but not limited to, a communication network, the Internet, an industry-specialized network and the like;

the sensing extension layer equipment refers to, but not limited to, an access network gateway, a sensing extension layer network terminal and node and equipment; and furthermore, the sensing extension layer equipment can provide information required by a user, and can also express an information requirement on behalf of the user. The above-mentioned terminal and the terminal described blow in the embodiment of the disclosure refer to the sensing extension layer equipment.

Preferably, the service management platform includes a joint radio resource management server and an edge server, wherein the joint radio resource management server is configured to store and maintain the context information of the network and the terminal, and provide a service of making a query to obtain the context information; the joint radio resource management server may provide the service of making a query to obtain the context information by establishing a search engine; and the edge server is configured to receive a service request, make a query to the joint radio resource management server to obtain an index of the context information according to the received service request, select a cooperative network and terminal for service content distribution, and distribute service content according to the selected cooperative network and terminal.

The edge server may be configured to judge whether a requested service content has been stored in the edge server or not according to the service request, distribute the corresponding stored service content to the cooperative network and terminal if the requested service content has been stored in the edge server, otherwise make a request to service content providing equipment for the corresponding service content, and distribute the acquired service content to the cooperative network and terminal.

The edge server may further be configured to, if multiple cooperative networks and terminals are selected, perform service stream segmentation on the service content when distributing the service content, and transmit service substreams obtained by stream segmentation to the corresponding cooperative networks and terminals respectively.

The method for service content distribution under a heterogeneous network is further described below with reference to the system architecture shown in FIG. 1 in detail.

In the system architecture shown in FIG. 1, a network 1, a network 2 and a network 3 represent user terminal networks, such as mobile communication networks or the Internet; and a network 4 represents a sensor network or another network which provides information data. The sensing extension layer equipment refers to an access network gateway, a sensing extension layer network terminal and node and the like, which can provide the information required by the user, and can also express an information requirement on behalf of the user. In FIG. 1, sensing extension layer equipment 1 represents terminal equipment of a user 1, sensing extension layer equipment 2 represents terminal equipment of a user 2, sensing extension layer equipment 3 represents terminal equipment of a user 3, and sensing extension layer equipment 4 represents data provision terminal equipment.

The case that a user terminal makes a request for service downloading is taken as an example, and as shown in FIG.

2, the method for service content distribution under a heterogeneous network mainly includes the following steps that:

Step 201: the sensing extension layer equipment 1 of the user 1 initiates a service downloading request;

Step 202: the service downloading request is transmitted to the edge server of the service management platform through a network where the sensing extension layer equipment 1 is located;

Step 203: the edge server buffers and parses the service downloading request after receiving the service downloading request, and makes a request to the joint radio resource management server for the index of the context information of the network and the terminal in an event triggering manner;

Step 204: the joint radio resource management server transmits the index of the context information to the edge server after receiving the request from the edge server;

Step 205: the edge server further compares the service downloading request with the index of the context information to select the context information, thereby selecting a network and a terminal, which are to be used; in the embodiment of the disclosure, it is supposed that the network 2, the network 3, the sensing extension layer equipment 2 in the network 2 and the sensing extension layer equipment 3 in the network 3 are selected;

the service downloading request here includes the information of the requested service, including, but not limited to, a requested service type, a requested service content, a user preference and other information. The joint radio resource management server provides the index of the context information of the network and the terminal, wherein the context information of the network includes a network description (such as a network identifier, a position, an access type, a coverage and an Internet Protocol (IP) address), a general resource of the network (such as a bandwidth, a supported service, an available media port, available service quality and security) and the context information of a stream; and the context information of the terminal refers to the context information of the terminal about communication, computation, service presentation and the like. A certain index of the context information of the network and the terminal has been stored in the radio resource management server, and by virtue of the index, the corresponding context information can be found. The edge server can find the network and the terminal, which match with the service downloading request, from the index, which is provided by the joint radio resource management server, of the context information of the network and the terminal according to the information in the service downloading request;

Step 206: the edge server performs comparative analysis on the service downloading request to judge whether the corresponding service content (i.e. the service content required by the user 1) has been buffered or not; Step 209 is executed if the corresponding service content has been buffered, otherwise Step 207 is executed;

service data information (or called service content) provided by other sensing extension layer equipment is buffered in the edge server, and meanwhile, a corresponding index is generated; the service downloading request includes, but not limited to, information such as a requested service type, requested service content and user preference; and the edge server performs comparative analysis on the information in the service downloading request and the index of the stored service data information to judge whether the service content corresponding to the service downloading request has been buffered in the edge server or not when receiving the service downloading request;

Step 207: if the service content required by the user 1 is not buffered in the edge server, the edge server makes a request to service provision equipment for the corresponding service content (i.e. the sensing extension layer equipment 4 in FIG. 1) through the network 4 in the event triggering manner;

Step 208: after receiving the service content request from the edge server, the service provision equipment performs parsing processing to extract the service content needed to be provided, and provides the service content for the edge server through the network 4, and then Step 209 is executed;

the parsing processing refers to that the service provision equipment parses and converts the information in the received service content request into data format information identified by the service provision equipment, thereby identifying the service content needed to be provided; and the service provision equipment downloads the service content in the event triggering manner, performs further processing to convert the service content into the data format information which can be identified by the network 4, and provides the data format information for the edge server through the network 4;

Step 209: the edge server performs service stream segmentation on the service content, allocates the service sub-streams obtained by stream segmentation to the network 2 and the network 3 respectively, and downloads the service sub-streams to the sensing extension layer equipment 2 and the sensing extension layer equipment 3 through the network 2 and the network 3 respectively;

wherein a manner of performing service stream segmentation on the service content includes, but not limited to, an equivalent stream segmentation manner, and a segmentation manner according to the service content and the like; the equivalent stream segmentation manner refers to a manner of segmenting the service content into two equal parts; for the segmentation manner according to the service content, if the service content includes an audio and video part, a text part and other parts, then the audio and video part, the text part and the like may be separated into different service sub-streams respectively, and the service sub-streams are downloaded through different networks and terminals respectively;

in addition, the content of each service sub-stream obtained by stream segmentation is different under a normal condition;

Step 210: the sensing extension layer equipment 2 and the sensing extension layer equipment 3 push the service contents through event trigger to the sensing extension layer equipment 1 after receiving the corresponding service sub-streams; and Step 211: the sensing extension layer equipment 1 presents the complete service content required by the user by virtue of service aggregation.

Each service sub-stream includes, but not limited to, a unified service stream byte header, or identification marks and identification sequence numbers specified by other users; the sensing extension layer equipment 1, after receiving all the service sub-streams, identifies the unified service stream byte header or the identification marks and the identification sequence numbers to perform service aggregation on the service sub-streams to form the complete service stream which existed before segmentation, i.e. the service content required by the user.

It should be noted that the function of the service management platform in storing and maintaining the context information of the network and the terminal in the embodiment of the disclosure can be realized not only by the joint radio resource management server, but also by other feasible alternative implementation modes; and functions of making a query to obtain an index of the context information, selecting a cooperative network and terminal for service content distribution according to the index, performing service content distribution on the selected cooperative network and terminal and the like can be realized not only by the edge server, but also by other feasible alternative implementation modes.

From the above, by the embodiments of the disclosure, not only radio network resources and terminal resources in a surrounding environment of a user can be fully utilized when multiple types of heterogeneous networks coexist, but also the cooperative network and terminal more suitable for the requested service can be provided by virtue of the selection of networks and terminals by the service management platform, so that an optimal technical solution for service content distribution is provided, the requested service can be better downloaded and provided, and a user experience is further enhanced.

The above are only the embodiments of the disclosure and not intended to limit the scope of protection of the disclosure.

What is claimed is:

1. A method for service content distribution under a heterogeneous network, comprising:
    storing and maintaining, by a joint radio resource management server of a service management platform, context information of a network and a terminal, wherein the context information of the network comprises: a network description, a general resource of the network and context information of a stream, and the context information of the terminal comprises: context information of the terminal about communication, computation, service presentation; and
    making a request, by an edge server of the service management platform, to the joint radio resource management server for an index of the context information when receiving a service request from an initiator terminal;
    transmitting, by the joint radio resource management server, the index of the context information to the edge server after receiving the request from the edge server;
    comparing, by the edge server, the service request with the index of the context information to select a cooperative network and a cooperative terminal in the cooperative network for service content distribution, and performing the service content distribution according to the cooperative network and the cooperative terminal in the cooperative network, so that the edge server transmits requested service content to the initiator terminal of the service request through the selected cooperative network and the cooperative terminal in the cooperative network;
    wherein performing the service content distribution according to the cooperative network and the cooperative terminal in the cooperative network comprises:
    performing, by the edge server of the service management platform, comparative analysis on information in the service request and an index of service data information buffered by the edge server of the service management platform itself, judging whether the requested service content has been stored in the edge server of the service management platform according to the comparative analysis, when the requested service content has been stored in the edge server of the service management platform, distributing corresponding stored service content to the cooperative network and the cooperative terminal in the cooperative network, and when the requested service content has not been stored in the edge server of the service management platform, making a request to service content providing equipment for corresponding service content and distributing acquired service content to the cooperative network and the cooperative terminal in the cooperative network;
    the method further comprises: when multiple cooperative networks and cooperative terminals are selected, performing, by the edge server of the service management platform, service stream segmentation on service content when the service content is distributed, and transmitting service sub-streams obtained by the service stream segmentation to corresponding cooperative networks and cooperative terminals respectively.

2. The method for service content distribution under a heterogeneous network according to claim 1, after the service content is distributed to the cooperative networks and cooperative terminals, the method further comprising:
    pushing, by the cooperative terminals, the service content received to the initiator terminal of the service request, and finishing, by the initiator terminal, presentation of the service content by service aggregation.

3. The method for service content distribution under a heterogeneous network according to claim 1, wherein the service management platform is located between a network layer and an application layer.

4. A service management platform, comprising a joint radio resource management server and an edge server, wherein
    the joint radio resource management server is configured to store and maintain context information of a network and a terminal, and transmit an index of the context information to the edge server after receiving a request from the edge server, wherein the context information of the network comprises: a network description, a general resource of the network and context information of a stream, and the context information of the terminal comprises: context information of the terminal about communication, computation, service presentation; and
    the edge server is configured to receive a service request from an initiator terminal, make the request to the joint radio resource management server for the index of the context information, receive the index of the context information transmitted by the joint radio resource management server and compare the service request with the index of context information to select a cooperative network and a terminal in the cooperative network for service content distribution, and distribute service content according to the cooperative network and the terminal in the cooperative network, so that the edge server transmits requested service content to the initiator terminal of the service request through the cooperative network and the terminal in the cooperative network;
    wherein the edge server is further configured to perform comparative analysis on information in the service request and an index of service data information buffered by the edge server itself, judge whether the requested service content has been stored in the edge server according to the comparative analysis, when the requested service content has been stored in the edge server, distribute corresponding stored service content to the cooperative network and the terminal in the cooperative network, when the requested service content has not been stored in the edge server, make a request to service content providing equipment for corresponding service content and distribute acquired service content to the cooperative network and the terminal in the cooperative network;

the edge server is further configured to, when multiple cooperative networks and cooperative terminals are selected, perform service stream segmentation on service content when distributing the service content, and transmit service sub-streams obtained by the service stream segmentation to corresponding cooperative networks and cooperative terminals respectively.

5. The service management platform according to claim 4, wherein the service management platform is located between a network layer and an application layer.

6. The method for service content distribution under a heterogeneous network according to claim 2, wherein the service management platform is located between a network layer and an application layer.

7. The method for service content distribution under a heterogeneous network according to claim 1, wherein the service request comprises a requested service type, the requested service content and user preference.

8. The service management platform according to claim 4, wherein the service request comprises a requested service type, the requested service content and user preference.

* * * * *